(12) United States Patent
Loeffler et al.

(10) Patent No.: US 6,434,463 B2
(45) Date of Patent: Aug. 13, 2002

(54) SYSTEM FOR ADJUSTING A TRANSMISSION RATIO IN A TRANSMISSION BUILT INTO A MOTOR VEHICLE

(75) Inventors: Juergen Loeffler, Ludwigsburg; Andrea Steiger-Pischke, Weissach; Martin-Peter Bolz, Buehl; Marko Poljansek, Reutlingen; Wolfgang Hermsen, Kirchheim; Holger Huelser; Rasmus Frei, both of Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/797,954

(22) Filed: Mar. 5, 2001

(30) Foreign Application Priority Data

Mar. 4, 2000 (DE) .......................... 100 10 764

(51) Int. Cl.$^7$ .............................................. G06F 7/00
(52) U.S. Cl. .............................. 701/51; 701/61; 477/34
(58) Field of Search ........................... 701/51, 61, 62; 477/34; 475/198, 207; 180/337

(56) References Cited

U.S. PATENT DOCUMENTS 5,157,609 A   10/1992   Stehle et al.
5,351,776 A   10/1994   Keller et al.
5,857,161 A   1/1999    Zeilinger et al.

FOREIGN PATENT DOCUMENTS

DE   4136613      5/1993
DE   198 14 483   4/1998

OTHER PUBLICATIONS

"Die Adaptive Getrielbesteuerung für Automatikgetriebe der BMW Fahrzeuqe mit Zwölfzylindermotor" by A. Welter et al, ATZ Automobiltechnische Zeitschrift 94 (1992) 9, pp. 428 to 439, No Month.

"Die Adaptive Getrielbesteuerung für BMW–Automobile" by A. Welter et al, ATZ Automobiltechnische Zeitschrift 95 (1993) 9, pp. 420 to 434, No Month.

*Primary Examiner*—Yonel Beaulieu
(74) *Attorney, Agent, or Firm*—Walter Ottesen

(57) ABSTRACT

A system for adjusting a transmission ratio in a transmission built into a motor vehicle has at least two determination elements for determining values based on different determination modes with these values representing individual driving situations of the motor vehicle. An administrator calls up the values from the determination elements and stores the values. The administrator outputs individual ones of the values in response to a command whereupon the transmission ratio is adjusted at least in dependence upon the outputted ones of the values.

6 Claims, 3 Drawing Sheets

SYSTEM FOR ADJUSTING A TRANSMISSION RATIO IN A TRANSMISSION BUILT INTO A MOTOR VEHICLE

BACKGROUND OF THE INVENTION

Adaptive transmission controls are, for example, known from U.S. Pat. No. 5,157,609 and German patent publication 4,136,613 as well as from the articles from "Automobiltechnische Zeitschrift" 94 (1992) 9, starting at page 428 and from "Automobiltechnische Zeitschrift" 95 (1993) 9, starting at page 420. In automatic transmissions, the transmission changes are, in general, determined in dependence upon the vehicle longitudinal speed and the engine load (throttle flap angle). This takes place by means of a characteristic field. In adaptive transmission control systems, the characteristic field can be adapted to the behavior of the driver (driver type), the traffic situation and/or the driving situation to which the vehicle is subjected. The transmission ratio changes are determined by means of the characteristic field. In setting the behavior of the driver, it is generally evaluated whether the driver adheres more to a driving-power orientated driving manner or more to a fuel optimized driving manner. In the evaluation of the traffic and driving situation, it can be distinguished, for example, whether the vehicle is in city traffic, ahead of or in a curve, on a hill or in overrun operation. Depending upon the evaluation of the above-mentioned points, the particular characteristic line which is suitable is selected from a number of different characteristic lines. Furthermore, a shifting of the base shifting characteristic field, as described in U.S. Pat. No. 5,857,161, can be provided.

The so-called driving situations (such as uphill travel, driving on slippery roadway (winter), driving with a cold engine (warming up) or driving in a curve) are a decisive influence on the selection of the transmission gear to be selected. This is so because, in each of these situations, there are specific characteristics which are to be considered in the selection of a transmission gear which ensure the driving safety and the driving comfort.

To recognize the traffic or driving situation to which the vehicle is subjected at a particular time, the state of the art suggests arriving at an estimate of the instantaneously present traffic and/or driving situation via different algorithms (for example, mountain recognition, curve recognition, winter operation recognition, city driving recognition and/or warm-up recognition).

Furthermore, a hierarchially structured control of the elements of the drive train of a motor vehicle is known from U.S. Pat. No. 5,351,776. The drive train includes, for example, the engine, clutch/torque convertor, transmission. A software structure for determining the transmission ratio is disclosed in U.S. Pat. No. 6,216,077 and incorporated herein by reference.

SUMMARY OF THE INVENTION

It is the object of the invention to configure the determination of individual driving or traffic situations so that the system can be adapted in an easy manner to as many different requirements as possible.

The system of the invention is for adjusting a transmission ratio in a transmission built into a motor vehicle. The system includes: at least two determination elements (FS_X(i)) for determining values based on different determination modes with the values representing individual driving situations of the motor vehicle; administration means for calling up the values from the determination elements (FS_X(i)) and storing the values; the administration means functioning to output individual ones of the values in response to a command (ACT_FS_X(i)); and, means for adjusting the transmission ratio at least in dependence on the outputted ones of the values.

The invention affords advantages with respect to expansion, functionality and the reusability as set forth below.

Expandability

The number of individual determination elements, which recognize individual driving situations, is virtually unlimited. An expansion of the system by additional determination elements is easily possible because, in accordance with the invention, fixedly defined interfaces are made available by the administration means. For example, if a system, which is applied for a specific vehicle engine type, is to be expanded for another vehicle type by further determination elements, then this is relatively simple in the system according to the invention because, for a new determination element, simply a new address or a new identification code need be added to the administration means.

Functionality

As mentioned, the determination of individual driving situations (for example, mountain recognition, curve recognition, winter operation recognition, city driving recognition and/or warm-up recognition) takes place in the individual determination elements. In response to the command in accordance with the invention, the determined individual values, which represent the individual driving situations of the motor vehicle, are called up. By means of an evaluation of these values, the gear selection can then determine the transmission gear to be selected. According to the invention, a separation therefore takes place between the actual evaluation of the driving situation for the gear selection and the determination of the individual driving situations in the determination means. This guarantees a high flexibility with respect to various requirements in the application to various vehicle types.

Reusability

For different requirements on the transmission control in a new vehicle type, the "old" structure for determining the individual driving situations remains unchanged. Under some circumstances, simply new determination elements need be added or old determination elements omitted.

For the same part requirements in a different context, determination means can be exchanged simply because of the interfaces defined in accordance with the invention.

In an advantageous embodiment of the invention, it is provided that means for gear selection are provided with which the command is outputted. The subsystem comprising the administration means and the determination means is therefore a part of a total system for transmission control. The actual evaluation of the individual driving situations takes place, as a rule, in the gear selection.

Furthermore, it can be provided that, via the administration means, the determined values can be called up cyclically by the determination elements and stored. The call-up of the values takes place therefore in a pregiven sequence. It can be especially provided that the administration means calls up and stores the determined values from the determination elements at pregiven time intervals, for example, every 25 ms.

It can be provided that the administration means calls up and stores the determined values from the determination elements in response to an additional command which, for example, proceeds from the above-mentioned gear selection.

Furthermore, the administration means can be so configured that at least one determination element is not called up or stored.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
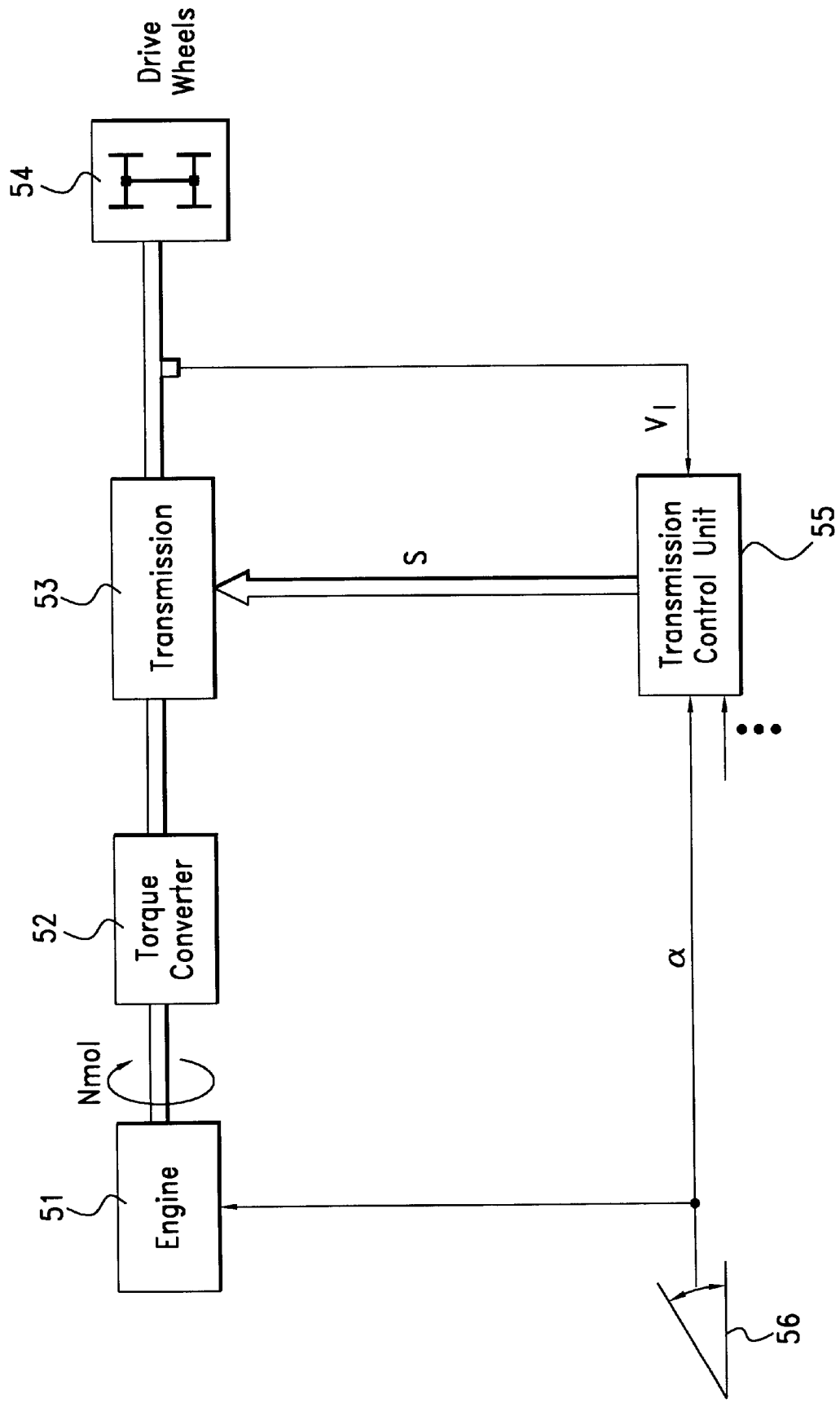
FIG. 1 is a schematic of the drive train of a motor vehicle shown in the context of a block circuit diagram.

FIG. 1 shows the drive train of a motor vehicle. The vehicle motor 51 has a motor rpm Nmot and is connected via a clutch or a torque converter 52 and via the transmission 53 to the drive wheels 54 of the vehicle. The driver of the vehicle actuates the accelerator pedal 56 and adjusts an accelerator pedal angle α. The power and/or torque of the vehicle motor 51 is controlled by the position α of the accelerator pedal 56. Furthermore, the position α of the accelerator pedal 56 as well as additional signals are supplied to the transmission control unit 55. As additional signals, for example, the signals of the following are considered: of a sensor for the transverse acceleration, of the wheel rpm sensors, of a temperature sensor and/or signals from the engine control. The transmission control unit 55 then determines a transmission gear essentially in dependence upon the input signals. The transmission gear is set by means of a signal S on the transmission 53.

Figure 2:
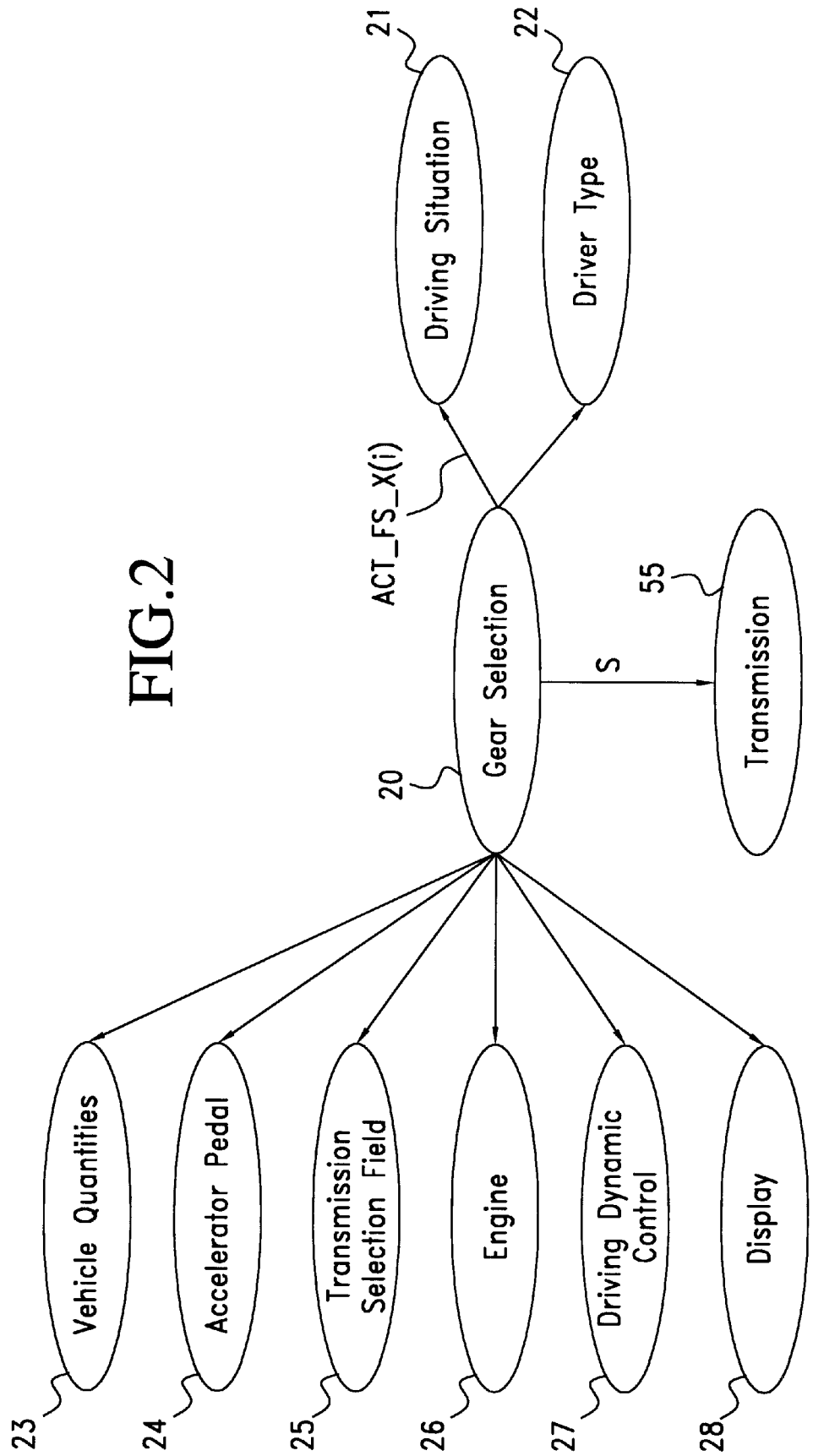
FIG. 2 shows an overview of the structure of the transmission control.

FIG. 2 shows the overview of the structure of a transmission control. Here, the actual selection of the transmission gear to be selected takes place in the gear selection 20. This gear data is supplied as an actuating signal S to the transmission 53 (FIG. 1).

The data for the determination of the transmission gear, which is to be selected, are supplied to the gear selector 20 by individual components. This can, for example, take place via specific inquiry commands by the gear selector 20. As components, the following blocks in FIG. 2 are presented as exemplary:

In the block "vehicle quantities" 23, data are stored which are individual to the vehicle.

The position of the accelerator pedal, which is actuated by the driver, can be called up by the block "accelerator pedal" 24.

The position of at least one of the selection switches (for example: P, 1, 2, 3, N, D, winter operation, economy/sport operating mode), which is to be adjusted by the driver of the vehicle, can be interrogated by the block "transmission selection field" 25.

Engine data, such as engine rpm, engine load and/or engine temperature are supplied by the block "engine" to the gear selection.

Data with respect to the instantaneously present drive dynamic performance are present in the block "driving dynamic control" 27.

The display in the view of the driver is characterized by reference numeral 28.

In the block "driver type" 22, a quantity is determined which provides information as to the behavior of the driver. Here, it is generally evaluated whether the driver tends to lean more to a driving behavior which is driving power orientated or whether the driver tends to a consumption-optimized driving behavior.

The arrows shown in FIG. 2 between the gear selector 20 and the blocks 21 to 28 are intended to show specific inquiry commands by the gear selector 20. In response to specific commands, the blocks transmit the wanted data to the gear selector 20. The communication between the gear selector 20 and individual blocks can, however, also take place in that the corresponding signals are continuously conducted to the gear selector, that is, without special inquiry commands from the gear selector 20.

The present invention relates to the block "drive situation" 21. For this reason, block 21 will now be described in greater detail with respect to FIG. 3.

The recognition of the driving situation is summarized in the object "driving situation" (block 21). This block 21 contains, as component objects, administration means 31 and any desired number of supply objects or determination elements FS_X(i) having the index i which, in the present embodiment, includes the values 1 to 5 (FS_X(1), FS_X(2), FS_X(3), FS_X(4), FS_X(5)).

The presence of individual driving situations is determined in the individual supply objects or determination elements FS_X(i). As already mentioned in the introduction hereto, methods are known as to how the presence of individual driving situations can be determined.

In the block "mountain", for example, an uphill travel is recognized and in the block "curve", the presence of a travel in a curve is detected and, in block "winter", driving on a slippery roadway is determined and, in block "city", driving in city traffic is detected and in block "warm-up", the warm-up phase of the engine is detected.

The computation or determination of all individual driving situations takes place cyclically in this embodiment, for example, every 25 ms via the function call-up "determine_all_FS" to the object "driving situation" 21. This function call-up can, for example, come from the gear selector 20.

Figure 3:
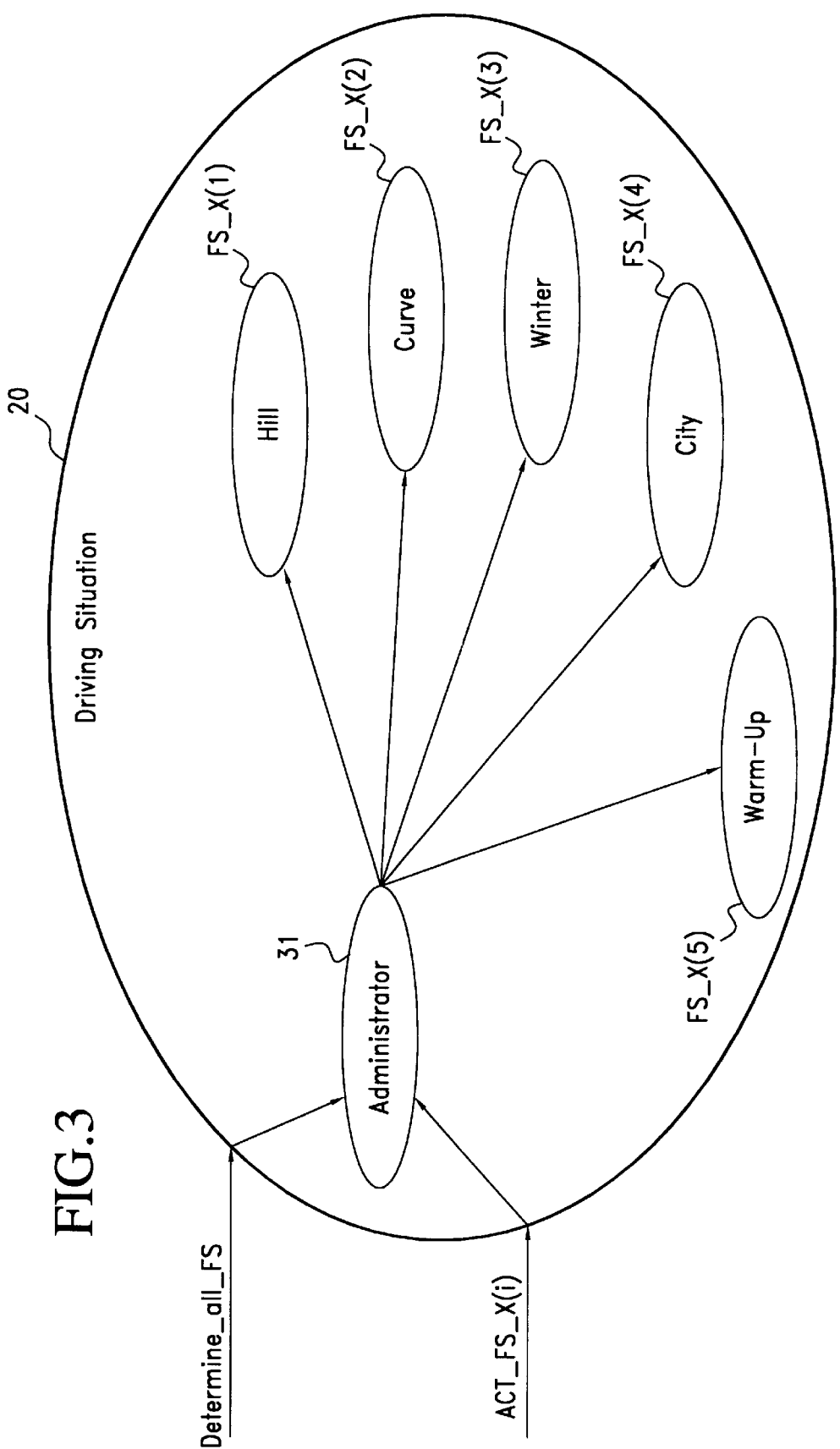
FIG. 3 shows the block "driving situation" in detail.

Via the function call-up "determine_all_FS", the administrating means 31 are commanded to call up sequentially the determination elements or the supply objects FS_X(i) and to store the respective determined result in the administrator, that is, a value representing the particular driving situation to be checked. The arrows shown in FIGS. 2 and 3 show the direction of the inquiry. The transmission of the respective responses takes place in the opposite directions.

In addition, an adjustment can be made in the administrator 31 via application values as to which supply objects or determination elements FS_X(i) are to be used. This application can be made, for example, by the manufacturer of the motor vehicle, for example, at the end of the production process (end of the assembly line).

For supply objects or determination elements FS_X(i) which are not intended to be computed, the result value, which is not applicable, is stored (for example, plane for mountain recognition, no curve for the curve recognition).

The inquiry of a specific driving situation FS_X(i=z) takes place with an inquiry ACT_FS_X(i=z) in general via any desired other part of the software, in the present embodiment, by the gear selector 20.

The inquiry ACT_FS_X(i=z) which, as a rule, can take place unpredictably at any time, is answered directly by the administrator 31 based on the intermediately-stored results. In this way, a complex computation effort in reaction to such an inquiry is avoided, however, the computation result, in the most unfavorable case, is already one cycle old which, however, does not, as a rule, mean any significant disadvantage.

In order to maintain the administrator independent of the supply objects or determination elements FS_X(i), the administrator can address the supply objects or determination elements FS_X(i) also via clear identification codes (ID) which are defined as so-called function pointers in an especially favorable form. In this way, the exchangeability of the supply objects or the determination elements FS_X(i) is further simplified. The inquiry of a specific driving situation then takes place in the same manner via the call-up ACT_FS(ID).

It is understood that the foregoing description is that of the preferred embodiments of the invention and that various changes and modifications may be made thereto without departing from the spirit and scope of the invention as defined in the appended claims.

What is claimed is:

1. A system for adjusting a transmission ratio in a transmission built into a motor vehicle, the system comprising:

at least two determination elements (FS_X(i)) for determining values based on different determination modes with said values representing individual driving situations of said motor vehicle;

administration means for calling up said values from said determination elements (FS_X(i)) and storing said values;

said administration means functioning to output individual ones of said values in response to a command (ACT_FS_X(i)); and, means for adjusting said transmission at least in dependence on the outputted ones of said values.

2. The system of claim 1, further comprising a gear selector for outputting said command (ACT_FS_X(i)).

3. The system of claim 1, wherein said administration means functions to cyclically call up said values from said determination elements (FS_X(i)) and store said values.

4. The system in claim 1, wherein said administration means functions to call up said values from said determination elements (FS_X(i)) at predeterminable time intervals and store said values.

5. The system of claim 1, wherein said administration means functions to call up said values from said determination elements (FS_X(i)) at predeterminable time intervals in response to an additional command (determine_all_FS) and store said values.

6. The system of claim 1, wherein said administration means is configured so that at least one determination element (FS_X(i)) is not called up and stored.

* * * * *